United States Patent
Imada et al.

(10) Patent No.: US 10,247,414 B2
(45) Date of Patent: Apr. 2, 2019

(54) COAL-FIRED BOILER EXHAUST GAS TREATMENT APPARATUS AND COAL-FIRED BOILER EXHAUST GAS TREATMENT METHOD

(71) Applicant: MITSUBISHI HITACHI POWER SYSTEMS, LTD., Yokohama-shi, Kanagawa (JP)

(72) Inventors: Noriyuki Imada, Yokohama (JP); Atsushi Katagawa, Yokohama (JP); Hirotaka Yamanari, Yokohama (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 0 days.

(21) Appl. No.: 15/736,673

(22) PCT Filed: May 9, 2016

(86) PCT No.: PCT/JP2016/063753
§ 371 (c)(1),
(2) Date: Dec. 14, 2017

(87) PCT Pub. No.: WO2016/203865
PCT Pub. Date: Dec. 22, 2016

(65) Prior Publication Data
US 2018/0180285 A1    Jun. 28, 2018

(30) Foreign Application Priority Data
Jun. 18, 2015  (JP) ................................. 2015-122793

(51) Int. Cl.
*F23J 15/02*  (2006.01)
*F23J 15/04*  (2006.01)
(Continued)

(52) U.S. Cl.
CPC ........ *F23J 15/022* (2013.01); *B01D 53/1481* (2013.01); *B01D 53/18* (2013.01);
(Continued)

(58) Field of Classification Search
CPC ........ B01D 53/46; B01D 53/50; B01D 53/56; B01D 53/64; B01D 53/75;
(Continued)

(56) References Cited

U.S. PATENT DOCUMENTS

| 8,071,060 | B2 * | 12/2011 | Ukai | ................... | B01D 53/501 423/210 |
| 2010/0071348 | A1 * | 3/2010 | Kobayashi | ............. | B01D 53/10 60/276 |

(Continued)

FOREIGN PATENT DOCUMENTS

| JP | 59-169594 A | 9/1984 |
| JP | 60-41529 A | 3/1985 |

(Continued)

OTHER PUBLICATIONS

International Search Report dated Jul. 12, 2016, issued in counterpart application No. PCT/JP2016/063753. (2 pages).

*Primary Examiner* — Timothy C Vanoy
(74) *Attorney, Agent, or Firm* — Westerman, Hattori, Daniels & Adrian, LLP

(57) ABSTRACT

An exhaust gas treatment apparatus which includes a denitration device, a dust collector, and a desulfurization device in order, respectively, in a flow path of exhaust gas discharged from a boiler, wherein a heavy-metal component removal device is provided in the exhaust gas flow path between the dust collector and the desulfurization device. This device is provided with: an absorption tower including a nozzle which sprays acidic absorption liquid on the exhaust gas, a tank which stores liquid which has absorbed (Continued)

a heavy metal, and a pump which supplies the nozzle with the liquid in the tank; a neutralizing tank which neutralizes the liquid drawn from the absorption tower; and a separator which separates the neutralized liquid into a solid and a liquid component. Since a small amount of heavy metal can be removed in the absorption tower, re-emission of the heavy metal by the desulfurization device is prevented.

4 Claims, 4 Drawing Sheets

(51) Int. Cl.
    *B01D 53/64*     (2006.01)
    *B01D 53/78*     (2006.01)
    *B01D 53/18*     (2006.01)
    *B01D 53/14*     (2006.01)
    *B01D 53/86*     (2006.01)
    *B01D 53/50*     (2006.01)
    *F23J 15/00*     (2006.01)

(52) U.S. Cl.
    CPC .......... *B01D 53/505* (2013.01); *B01D 53/64* (2013.01); *B01D 53/78* (2013.01); *B01D 53/8625* (2013.01); *F23J 15/00* (2013.01); *F23J 15/04* (2013.01); *B01D 2252/10* (2013.01); *B01D 2257/602* (2013.01)

(58) Field of Classification Search
    CPC .......... B01D 2257/302; B01D 2257/40; B01D 2257/602; B01D 2258/0283; B01J 19/00; B01J 19/0086; B01J 2219/00177; B01J 2219/00966; B01J 2219/0875
    See application file for complete search history.

(56) References Cited

U.S. PATENT DOCUMENTS

| | | | |
|---|---|---|---|
| 2013/0071311 A1* | 3/2013 | Ukai | ............ B01D 53/75 |
| | | | 423/235 |
| 2015/0023852 A1* | 1/2015 | Sjostrom | ............ B01D 53/64 |
| | | | 423/210 |

FOREIGN PATENT DOCUMENTS

| | | | |
|---|---|---|---|
| JP | 64-38195 A | 2/1989 |
| JP | 9-313881 A | 12/1997 |
| JP | 2006-281171 A | 10/2006 |
| JP | 2010-23004 A | 2/2010 |
| JP | 2012-200721 A | 10/2012 |
| JP | 5186699 B2 | 4/2013 |
| JP | 5198786 B2 | 5/2013 |
| JP | 2014-57912 A | 4/2014 |
| JP | 5484689 B2 | 5/2014 |
| JP | 2014-121685 A | 7/2014 |
| JP | 2014-237073 A | 12/2014 |

\* cited by examiner

COAL-FIRED BOILER EXHAUST GAS TREATMENT APPARATUS AND COAL-FIRED BOILER EXHAUST GAS TREATMENT METHOD

TECHNICAL FIELD

The present disclosure relates to a flue-gas treatment apparatus and a flue-gas treatment method for purifying an exhaust gas of a coal-fired boiler using coal as a fuel, and more particularly, to a coal-fired boiler exhaust gas treatment apparatus and a coal-fired boiler exhaust gas treatment method for removing heavy metal such as mercury contained in the exhaust gas.

BACKGROUND ART

FIG. 4 illustrates an example of a conventional coal-fired boiler for power generation and an exhaust gas treatment apparatus thereof.

Coal supplied from a coal supply line 21 is burned in a boiler 1 by air supplied from a combustion air supply line 36, and the generated high-temperature exhaust gas is heat exchanged by a heat exchanger 11 provided at an outlet of the boiler 1 to generate steam, such that a power generator 13 is operated with the steam supplied by a steam turbine 12. The low-pressure steam discharged from the steam turbine 12 is gradually cooled by a condenser 14, then is again pressurized by a pump 15 and sent to the heat exchanger 11.

The combustion exhaust gas is treated as follows. It is configured in such a way that: first, nitrogen oxide (hereinafter, referred to as NOx) in the exhaust gas is reduced to nitrogen by a denitration catalyst in a denitration device 2 installed on an exhaust gas flow downstream side of the boiler 1, then a gas temperature is decreased by an air heater (A/H) 3, and ash is removed by a dust collector 4; and next, sulfur oxide (hereinafter, referred to as SOx) is removed by a desulfurization device 5, then is discharged from a chimney 16 to the atmosphere, thereby removing ash dust, NOx, and SOx in the exhaust gas.

In the desulfurization device 5, a desulfurization absorption liquid containing an absorbent such as a slurry containing limestone (calcium carbonate) or lime is sprayed as fine droplets from desulfurization spray nozzles 27. The droplets of the desulfurization absorption liquid and the exhaust gas contact with each other, such that the SOx in the exhaust gas is chemically absorbed and removed by surfaces of the absorption liquid droplets from the desulfurization spray nozzles 27, together with an acidic gas such as ash dust, hydrogen chloride (HCl), and hydrogen fluoride (HF) in the exhaust gas.

The absorption liquid absorbing the SOx (mainly $SO_2$) is once collected in a circulation tank 28 at a bottom of the desulfurization device 5, and is oxidized by the air supplied from an air supply pipe for oxidation (not illustrated) to generate calcium sulfate (gypsum). A part of the absorption liquid extracted from the circulation tank 28 is supplied to the desulfurization spray nozzles 27 through the circulation pipe 25 by a pump 26, and the remaining part thereof is separated from the gypsum by a gypsum separator 29, and then gypsum 30 is recovered.

The absorption liquid separated from the gypsum 30 is returned from a storage tank 31 to the desulfurization device 5 through a desulfurization absorption liquid return pipe 35 by a pump 32, or a part thereof is sent to a wastewater treatment device 67. In addition, a part thereof is returned to a calcium carbonate supply device 44, and is also used to adjust the absorbent such as a limestone slurry. In the wastewater treatment device 67, harmful substances including heavy metals contained in the wastewater are removed, then a waste fluid is discharged to an outside the system.

In recent years, regulations against the mercury contained in the coal have been increasingly reinforced, and several methods for removing heavy metals, mainly the mercury from the exhaust gas have been proposed and practically used.

According to Patent Document 1 below, by reinforcing a mercury oxidative function of the denitration catalyst, a mercury removal characteristic is improved. The mercury in the coal is discharged into the exhaust gas as a form of elemental mercury in a combustion field. This elemental mercury is minimally adsorbed to a solid such as ash, and also has low water solubility. In this form, the elemental mercury passes through an exhaust gas treatment apparatus such as a conventional dust collector or desulfurization device, and is discharged to the atmosphere. Therefore, in Patent Document 1, the mercury oxidative function that converts the elemental mercury into oxidized mercury is added to the denitration catalyst. The oxidized mercury is easily adsorbed to the solid, and has high water solubility. A part thereof is attached to the ash in the exhaust gas and is removed together with the ash by the dust collector, and most thereof is absorbed into the absorption liquid of the desulfurization device, such that releasing to the atmosphere may be prevented.

In addition, according to Patent Document 2 below, by adding a halogen compound to an exhaust gas flow upstream side of the denitration catalyst, the mercury removal characteristic is improved. Mercury is reacted with halogens (chlorine and bromine) in the exhaust gas to become oxidized mercury. If an amount of these halogens in the coal is small, a ratio of mercury converted into the oxidized mercury is reduced. Therefore, in Patent Document 2, by adding the halogens to the exhaust gas flow upstream side of the denitration catalyst, the ratio of mercury in the exhaust gas converted into the oxidized mercury is increased, thereby increasing a mercury removal rate in the exhaust gas.

Further, according to Patent Document 3 below, by adding a mercury adsorbent such as activated carbon to a duct on the exhaust gas flow upstream side of the dust collector, mercury in the exhaust gas is adsorbed by the adsorbent, and is recovered and removed by the dust collector together with the ash.

Furthermore, according to Patent Document 4 below, a scrubber is provided in an exhaust gas flow path between the dust collector and the desulfurization device, and activated carbon is added to the exhaust gas to adsorb the mercury and then washed by the scrubber. The waste fluid after washing is separated into a solid component and a liquid component by a solid-liquid separator, and the liquid component is returned to the scrubber to be reused. In addition, activated carbon of a solid component is dried at a temperature not exceeding 90° C. at which the mercury is not desorbed, and then is again added to the exhaust gas.

CITATION LIST

Patent Document

[Patent Document 1] Japanese Patent Publication No. 5186699

[Patent Document 2] Japanese Patent Publication No. 5484689

[Patent Document 3] Japanese Patent Publication No. 5198786
[Patent Document 4] Japanese Unexamined Application Publication No. 2010-23004

SUMMARY OF INVENTION

Technical Problem

In the above methods, a part of mercury in the exhaust gas may be removed and a ratio of mercury diffused to the atmosphere may be reduced. However, these techniques have the following problems.

In Patent Documents 1 and 2, most of the converted oxidized mercury is absorbed into the absorption liquid of the desulfurization device. A part of the absorbed mercury migrates to the gypsum, which is a by-product generated in the desulfurization device, and the other part thereof remains on the waste fluid side. An allocation ratio of the remaining mercury is changed by a type of coal as fuel, a method or operating conditions of desulfurization device.

When a large amount of mercury migrates to the gypsum which is a by-product, there is a problem that the reuse of the gypsum is limited. In addition, when a large amount of the absorbed mercury remains on the waste fluid side, there is also a problem that the concentration of mercury in the absorption liquid circulating in the desulfurization device is increased, and the absorbed mercury is again discharged into the exhaust gas.

In addition, $SO_2$ absorbed into the absorption liquid is converted into the gypsum by oxidizing air. At this time, depending on the conditions, a reaction, in which the oxidized mercury in the liquid is reduced to elemental mercury, may occur. In this case, the once absorbed mercury is again discharged to the exhaust gas side, and as a result, the mercury may be dissipated to the atmosphere.

In addition, in Patent Document 3, a problem, in which a large amount of activated carbon is contained in the ash recovered by the dust collector, and the ash cannot be reused, occurs.

Further, in Patent Document 4, the exhaust gas is cooled to a temperature at which the mercury does not fall out of the powdered activated carbon, such that falling of the mercury may be prevented, but since a part of the powdered activated carbon is used repeatedly, it is estimated that an adsorption performance of the mercury is decreased in a similar manner. Therefore, a removal efficiency of the mercury is also unsatisfactory, and if the mercury that is not adsorbed to the powdered activated carbon remains in cleaning water, it may cause a re-emission of the mercury, or the mercury may be condensed. In addition, it is conceivable that a part of the powdered activated carbon is supplied to the desulfurization device without being removed by the scrubber, and the activated carbon and the mercury may be mixed into the gypsum.

Coal mainly used in Japan now has a small amount of heavy metal such as mercury contained therein, but other countries may use coal containing the heavy metal in a high concentration. In addition, there may be a case of using low-cost and low-quality coal imported from abroad, such that the above-described problems are particularly apparent.

It is an object of the present disclosure to provide a coal-fired boiler exhaust gas treatment apparatus and a coal-fired boiler exhaust gas treatment method, which are capable of reducing an amount of heavy metal discharged to an outside air, and efficiently removing the heavy metal, by preventing heavy metal from an absorption liquid of a desulfurization device from being re-discharged, and the heavy metal from being mixed into gypsum which is a by-product.

Solution to Problem

The above object may be achieved by employing the following configurations.

An invention of a first aspect of the present disclosure is a coal-fired boiler exhaust gas treatment apparatus in which a denitration device (2) including a denitration catalyst to remove nitrogen oxide in an exhaust gas, a dust collector (4) configured to remove ash dust in the exhaust gas, and a desulfurization device (5) configured to remove sulfur oxide in the exhaust gas by an absorption liquid are sequentially disposed from an upstream side to a downstream side of exhaust gas flow, in a flow path of the exhaust gas discharged from a boiler (1) using coal as a fuel, the coal-fired boiler exhaust gas treatment apparatus including: a heavy-metal component removal device (10) provided in an exhaust gas flow path between the dust collector (4) and the desulfurization device (5) to remove a heavy-metal component in the exhaust gas, wherein the heavy-metal component removal device (10) includes: an absorption tower (45) including a heavy-metal absorption unit (47) configured to spray an acidic absorption liquid having a pH of 1 to 3 for absorbing heavy metal to the exhaust gas, a storage unit (49) configured to store a heavy-metal absorption liquid absorbing the heavy metal in the heavy-metal absorption unit (47), and a circulation unit (50 and 69) configured to supply the heavy-metal absorption liquid of the storage unit (49) to the heavy-metal absorption unit (47); an extraction unit (51) configured to extract the heavy-metal absorption liquid from the absorption tower (45); a neutralization unit (52 and 60) configured to supply a pH adjuster to the heavy-metal absorption liquid extracted by the extraction unit (51) and neutralize the same so that the pH of the heavy-metal absorption liquid in the neutralization unit is 5 to 7; and a solid-liquid separation unit (53) configured to separate a solid component and a liquid component from the heavy-metal absorption liquid neutralized in the neutralization unit (52 and 60).

An invention of a fourth aspect of the present disclosure is the coal-fired boiler exhaust gas treatment apparatus according to the first aspect of the present disclosure, wherein the apparatus may further include a waste fluid supply unit configured to supply a part of the liquid component separated by the solid-liquid separation unit to an exhaust gas flow path between the denitration device and the dust collector.

An invention according to a fifth aspect of the present disclosure is a coal-fired boiler exhaust gas treatment method in which nitrogen oxide in an exhaust gas discharged from a boiler using coal as a fuel is removed by a denitration catalyst, and ash dust is removed from the exhaust gas after removing the nitrogen oxide, and then sulfur oxide is removed from the exhaust gas by an absorption liquid after removing the ash dust, the coal-fired boiler exhaust gas treatment method including: spraying an acidic absorption liquid having a pH of 1 to 3 for absorbing heavy metal to the exhaust gas after removing the ash dust and before removing the sulfur oxide; again using the heavy-metal absorption liquid after spraying for absorbing the heavy metal, and supplying a pH adjuster to a part of the heavy-metal absorption liquid after spraying, thus to neutralize the same so that the pH of the heavy-metal absorption liquid is 5 to 7; and separating a solid component and a liquid component from the neutralized heavy-metal absorption liquid, thus to remove a heavy-metal component in the exhaust gas.

An invention of an eighth aspect of the present disclosure is the coal-fired boiler exhaust, gas treatment method according to the fifth aspect of the present disclosure, wherein the method may further include supplying a part of the separated liquid component to the exhaust gas after removing the nitrogen oxide and before removing the ash dust.

(Action)

Since oxidized mercury in the exhaust gas has high water solubility, and an adsorption performance thereof is minimally influenced by the pH of the absorption liquid, the absorption liquid containing water as a main component is sprayed to the exhaust gas in the absorption tower of the heavy-metal component removal device, such that most of the oxidized mercury in the exhaust gas is absorbed into the absorption liquid. When $SO_2$ in the exhaust gas is simultaneously absorbed with the mercury into the absorption liquid, during the oxidation of the $SO_2$ in the absorption liquid, the mercury in the liquid may be reduced and discharged (re-emission of the mercury) into the exhaust gas, but the absorption liquid is acidified by adjusting the pH thereof, such that it becomes difficult for the $SO_2$ to be absorbed. For example, by setting the pH of the absorption liquid to be 1 to 3, the re-emission of the mercury is suppressed without absorbing the $SO_2$. That is, when the pH of the absorption liquid is 1 to 3 by absorbing the $SO_2$ in the exhaust gas, the $SO_2$ may not be absorbed due to an absorption equilibrium of $SO_2$.

FIGS. 3(A) to 3(C) illustrate an example of the pH of the absorption liquid, and mercury absorption and $SO_2$ absorption characteristics thereof. A vertical axis in FIG. 3(A) represents an Hg absorption rate (%), the vertical axis in FIG. 3(B) represents an $SO_2$ absorption rate (%), and the vertical axis in FIG. 3(C) represents an Hg concentration (μg/L) in the liquid. These data are obtained by introducing the absorption liquid into a reactor simulating the absorption tower of the heavy-metal component removal device, supplying a gas simulating the exhaust gas to the absorption liquid, and measuring the adsorption characteristics of Hg and $SO_2$. The absorption liquid was industrial water, the mercury concentration in the liquid was set to be 100 μg/L at 50° C. equal to the actual apparatus, and the Ph thereof was changed from 1 to 5. Since the $SO_2$ was present in the gas, calcium carbonate (alkali) was used as the pH adjuster.

Further, in the present disclosure, the industrial water is water used for industrial production, and usually has a pH of a neutral range (about 6 to 8). Specifically, the industrial water is water used for cooling, cleaning, product processing, and the like in the manufacturing process of an industrial product, and uses clarified water of sewage, other than clean water, ground water, and river water. In addition, a temperature of the simulated exhaust gas was set to be 50° C., and components of the simulated exhaust gas were set to contain oxygen at a concentration of 8%, carbon dioxide at a concentration of 13%, $SO_2$ at a concentration of 2000 ppm, Hg at a concentration of 10 μg/Nm³, and nitrogen as the rest. The concentrations of the Hg and $SO_2$ in the gas were measured using each monitor. The concentration of the mercury in the liquid was measured by reduction vaporization-atomic absorption methods.

According to FIG. 3(B), when the absorption liquid has a pH of 3 or less, the $SO_2$ in the exhaust gas is minimally absorbed. Meanwhile, in a case of mercury absorption characteristics in the exhaust gas, it can be seen from FIG. 3(A) that, if the pH thereof is 3 or more, the mercury adsorption performance is decreased since the mercury in the liquid is re-discharged to the exhaust gas. It can be said that the reason for re-discharging the mercury at the pH of 3 or more is that the $SO_2$ is oxidized and the mercury is reduced during absorbing the $SO_2$, as seen from FIG. 3(B). It can be seen that, also in a case in which the pH in the liquid is too low as 1 or less, although the quantity is minute, the re-emission of the mercury occurs. Accordingly, it is desirable to control the absorption liquid so as to have a pH of 1 to 3.

As illustrated in FIG. 3(C), a part of the mercury in the absorption liquid migrates to the ash dust contained in the liquid by setting the pH of the liquid to be 5 or more. Thereafter, by separating the solid component and the liquid component, a trace amount of heavy metal such as mercury in the absorption liquid is discharged to an outside of the system together with the solid component.

Therefore, in accordance with the invention according to the first or fifth aspect, by providing the heavy-metal component removal device in the exhaust gas flow path between the dust collector and the desulfurization device, it is possible to efficiently remove the trace amount of heavy metal such as mercury after the ash is removed. Accordingly, it is possible to greatly reduce mixing of the heavy metal into the gypsum, which is a by-product generated during removing SOx contained in the exhaust gas by the desulfurization device, and effectively reuse the recovered gypsum.

Further, since the concentration of the heavy metal in the absorption liquid in the desulfurization device may also be greatly reduced, it is also possible to prevent re-emission of the absorbed heavy metal during absorption processing the SOx in the exhaust gas, and greatly reduce the emission of heavy metal to the atmosphere.

In addition, since the acidic absorption liquid is used in the absorption tower of the heavy-metal component removal device, it is also possible to efficiently remove a trace amount of the heavy metal such as mercury, and then by neutralizing the absorption liquid, the trace amount of the heavy metal effectively migrates to the solid component, and thereby the heavy-metal component may be discharged to the outside the system.

Further, in accordance with the invention according to the first or fifth aspect, by setting the pH of the absorption liquid sprayed in the absorption tower of the heavy-metal component removal device to be a range in which the $SO_2$ in the exhaust gas is minimally adsorbed and the mercury is minimally re-discharged to the exhaust gas, the absorption rate of the heavy metal in the absorption tower is further increased, and the heavy metal is efficiently removed.

Further, in accordance with the invention according to the first or fifth aspect, by setting the pH of the liquid absorbing the heavy metal in the neutralization unit to be 5 to 7, migration of the heavy metal to the solid side is facilitated, and the heavy metal is efficiently recovered by the solid-liquid separation unit.

Furthermore, in accordance with the invention according to the fourth or eighth aspect, in addition to the action of the invention according to the first or fifth aspect, by supplying a wastewater generated from the heavy-metal component removal device to the upstream side of the exhaust gas flow path of the dust collector, it is also possible to effectively use the wastewater. In addition, the chlorine contained in the wastewater comes into contact with a high temperature exhaust gas, and thereby water evaporates to become a solid, such that the chlorine is removed together with the ash by the dust collector.

Advantageous Effects

In accordance with the invention according to the first or fifth aspect, since a trace amount of the heavy metal such as mercury may be efficiently removed and recovered by the absorption tower, it is also possible to greatly reduce mixing of the heavy metal into the gypsum which is a by-product generated in the desulfurization device, and effectively reuse the recovered gypsum.

Furthermore, since the concentration of the heavy metal in the absorption liquid in the desulfurization device may also be greatly reduced, it is also possible to prevent the heavy metal in the absorption liquid from being re-discharged, and greatly reduce the emission of heavy metal discharged to the atmosphere.

Further, in accordance with the invention according to the first or fifth aspect, the absorption rate of the heavy metal in the absorption tower may be further increased, and the heavy metal may be efficiently removed.

Further, in accordance with the invention according to the first or fifth aspect, the migration of the heavy metal in the neutralization unit to the solid side may be facilitated, such that the heavy metal may be efficiently recovered by the solid-liquid separation unit.

Furthermore, in accordance with the invention according to the fourth or eighth aspect, in addition to the effect of the invention according to the first or fifth aspect, since the wastewater generated from the absorption tower may be effectively used, a size of the wastewater treatment equipment of the exhaust gas treatment apparatus may be reduced, and a simple structure may be obtained. In addition, the chlorine in the exhaust gas may be efficiently removed by the dust collector.

DESCRIPTION OF EMBODIMENTS

Hereinafter, embodiments of the present disclosure will be described.

Example 1

Figure 1:
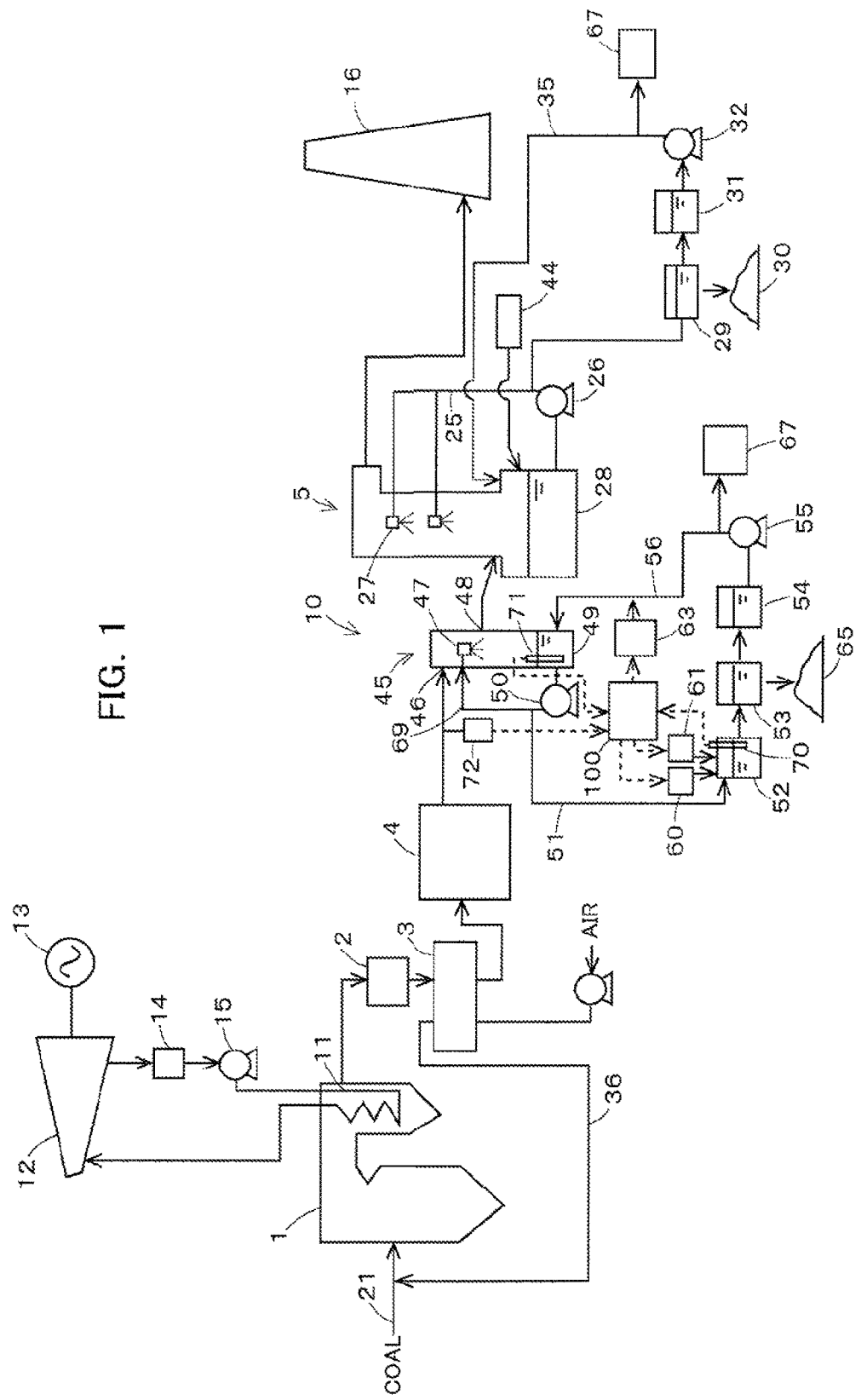
FIG. 1 is a view illustrating a structure of an exhaust gas treatment apparatus which is one example (Example 1) of the present disclosure.
Figure 4:
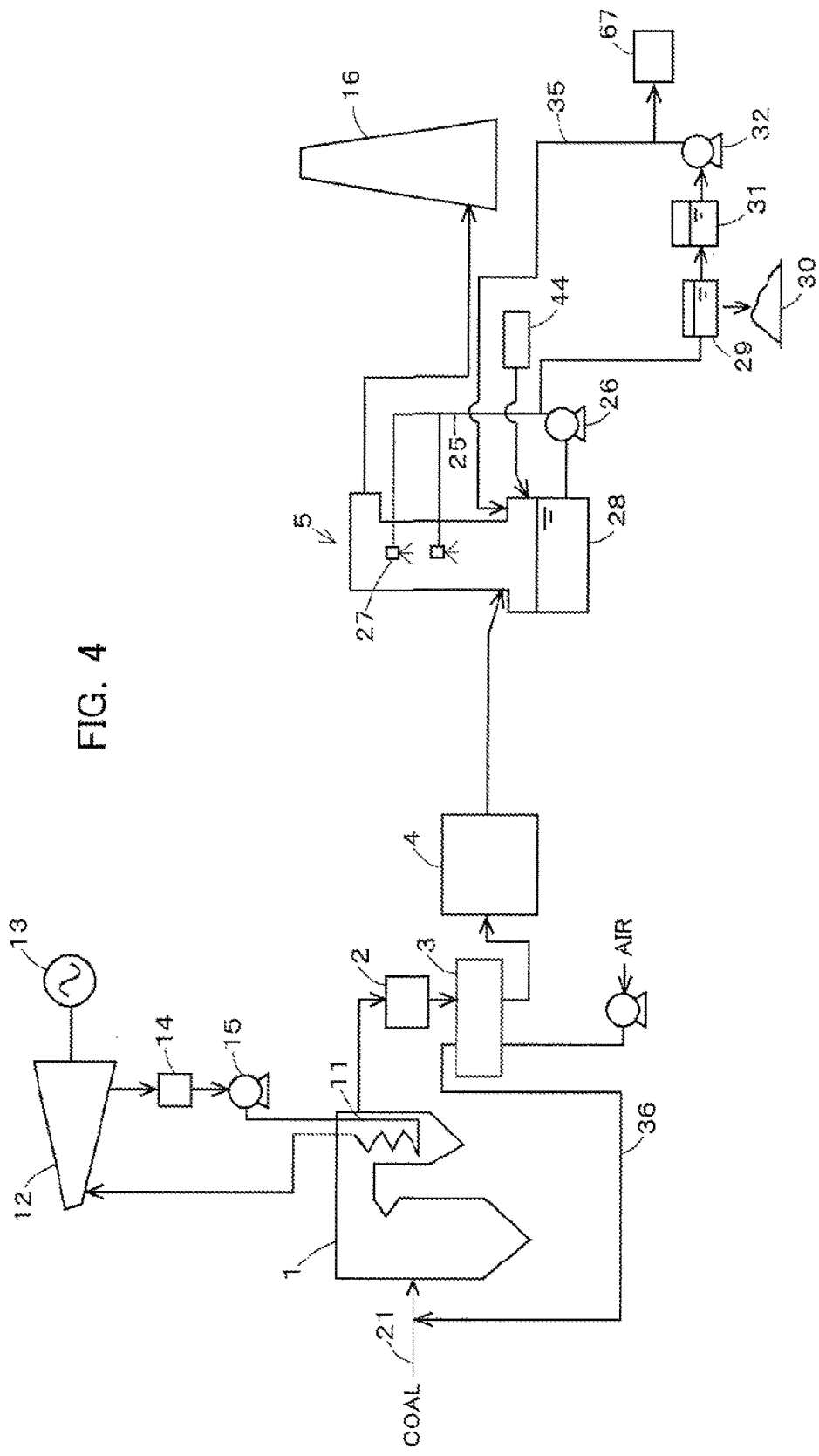

FIG. 1 is a view illustrating a structure of an exhaust gas treatment apparatus which is an example of the present disclosure. Further, a part of the same parts in the exhaust gas treatment apparatus of FIG. 1 as those in the exhaust gas treatment apparatus of FIG. 4 will not be described while denoting by the same reference numerals.

Coal supplied from a coal supply line 21 is burned in a boiler 1 by air supplied from a combustion air supply line 36, and the generated high-temperature exhaust gas is heat exchanged by a heat exchanger 11 provided at an outlet of the boiler 1 to generate steam, such that a power generator 13 is operated with the steam supplied by a steam turbine 12. The low-pressure steam discharged from the steam turbine 12 is gradually cooled by a condenser 14, then is again pressurized by a pump 15 and sent to the heat exchanger 11.

The combustion exhaust gas is treated as follows. It is configured in such a way that: first, NOx in the exhaust gas is reduced to nitrogen by a denitration catalyst in a denitration device 2 installed on an exhaust gas flow downstream side of the boiler 1, then a gas temperature is decreased by an A/H 3, and ash is removed by a dust collector 4; and next, SOx is removed by a desulfurization device 5, then is discharged from a chimney 16 to the atmosphere, thereby removing ash dust, NOx, and SOx in the exhaust gas.

In the desulfurization device 5, a desulfurization absorption liquid containing an absorbent such as a slurry containing limestone or lime is sprayed as fine droplets from desulfurization spray nozzles 27. The droplets of the desulfurization absorption liquid and the exhaust gas contact with each other, such that the SOx in the exhaust gas is chemically absorbed and removed by surfaces of the absorption liquid droplets from the desulfurization spray nozzles 27, together with an acidic gas such as ash dust, HCl, and HF in the exhaust gas.

The absorption liquid absorbing the SOx (mainly $SO_2$) is once collected in a circulation tank 28 at a bottom of the desulfurization device 5, and is oxidized by the air supplied from an air supply pipe for oxidation (not illustrated) to generate gypsum. A part of the absorption liquid extracted from the circulation tank 28 is supplied to the desulfurization spray nozzles 27 though the circulation pipe 25 by a pump 26, and the remaining part thereof is separated from the gypsum by a gypsum separator 29, and then gypsum 30 is recovered.

The absorption liquid separated from the gypsum 30 is returned from a storage tank 31 to the desulfurization device 5 through a desulfurization absorption liquid return pipe 35 by a pump 32, or a part thereof is sent to a wastewater treatment device 67. In addition, a part thereof is returned to a calcium carbonate supply device 44, and is also used to adjust the absorbent such as a limestone slurry. In the wastewater treatment device 67, harmful substances including heavy metals contained in the wastewater are removed, then a waste fluid is discharged to an outside the system.

The present example is characterized in that a heavy-metal absorption tower 45 is provided in an exhaust gas flow path between the dust collector 4 and the desulfurization device 5 to form a heavy-metal component removal device 10. The heavy-metal absorption tower 45 includes an exhaust gas inlet 46, heavy-metal absorption liquid spray nozzles 47 for spraying a heavy-metal absorption liquid, an exhaust gas outlet 48, and a circulation tank 49 for the heavy-metal absorption liquid, which are disposed in this order from a top to a bottom. In addition, the heavy-metal absorption liquid in the circulation tank 49 is pressurized by a pump 50 and supplied to the heavy-metal absorption liquid spray nozzles 47 through a circulation pipe 69. Further, it is configured in such a way that the circulation pipe 69 is connected with an extraction pipe 51, and a part of the heavy-metal absorption liquid is sent from the circulation tank to a neutralization tank 52, a solid-liquid separator 53, a storage tank 54 and a pump 55 through the extraction pipe 51. Industrial water is used as the heavy-metal absorption liquid.

Due to the present configuration, after the ash is removed by the dust collector 4, a trace amount of heavy metal such as mercury may be removed in the heavy-metal absorption tower 45, such that it is possible to greatly reduce mixing of the heavy metal into the gypsum which is a by-product generated in the desulfurization device 5, and effectively reuse the recovered gypsum. Furthermore, since the concentration of the heavy metal in the absorption liquid in the desulfurization device 5 may also be greatly reduced, it is also possible to prevent the heavy metal in the absorption liquid from being re-discharged, and greatly reduce the emission of the heavy metal to the atmosphere.

Next, a behavior of heavy-metal components such as mercury will be described.

In the boiler 1, mercury in the coal is discharged into the exhaust gas as elemental mercury, and a part thereof is converted into oxidized mercury by a denitration catalyst in the denitration device 2.

In the present example, a catalyst with an enhanced mercury oxidative function was employed as the denitration catalyst, and a removal rate of NOx was about 95% at a gas temperature of 380° C. Further, the denitration catalyst is not limited to the catalyst with the enhanced mercury oxidative function, and also in the catalyst with the enhanced mercury oxidative function, while it is not limited thereto, there is a catalyst having, for example, metal oxides or sulfates such as vanadium (V), tungsten (W), molybdenum (Mo), nickel (Ni), cobalt (Co), iron (Fe), chromium (Cr), copper (Cu), and manganese (Mn), etc., or noble metals such as platinum (Pt), ruthenium (Ru), rhodium (Rh), palladium (Pd), and iridium (Ir), etc., or a mixture thereof, supported on a carrier including at least one of $TiO_2$, $SiO_2$, $ZrO_2$, and zeolite, etc.

Next, the exhaust gas is heat exchanged with a combustion air flowing through the combustion air supply line 36 by the A/H 3, and is supplied to the dust collector 4 with the temperature thereof being reduced to about 180° C. In the dust collector 4, a part of the oxidized mercury in the exhaust gas is attached to the ash, and is discharged to an outside of the system together with the ash. In the present example, the concentration of the mercury in the ash recovered by the dust collector 4 was measured by reduction vaporization-atomic absorption methods, and as a result, about 10% of the mercury in the exhaust gas was adhered to the ash to be removed.

Thereafter, the exhaust gas is supplied to the heavy-metal absorption tower 45, and most of the oxidized mercury in the exhaust gas is absorbed into the heavy-metal absorption liquid sprayed from the heavy-metal absorption liquid spray nozzles 47. The heavy-metal absorption liquid was adjusted so as to have a pH of 1 to 3.

Specifically, the pH of the heavy-metal absorption liquid is adjusted by the following method.

By absorbing $SO_2$ in the exhaust gas at the time of starting an operation with the heavy-metal absorption liquid having a high pH, the pH thereof is reduced to 1 or less.

On the other hand, a part of the heavy-metal absorption liquid is extracted from the extraction pipe 51 to set the pH thereof to be 5 to 7 in the neutralization tank 52, and then is again returned to the heavy-metal absorption tower 45, such that the pH of the liquid is increased from 1 to be about 1 to 3. As also can be seen from FIG. 3(C), by setting the pH to be 5 or more in the neutralization tank 52, the mercury in the liquid may migrate to the solid side. Further, when the pH is 7 or more, there is no difference in a migration rate to the solid side, and only a consumption of a pH adjuster is increased, such that the upper limit of pH is set to be 7. In a case of more exactly controlling the pH, it may be performed as follows.

The pH of the heavy-metal absorption liquid in the neutralization tank 52 and the pH of the heavy-metal absorption liquid in the circulation tank 49 of the heavy-metal absorption tower 45 are measured by pH meters 70 and 71, respectively, and a supply amount of an aqueous sodium hydroxide solution from a pH adjuster supply device 60 is controlled by a control device 100, so that the pH of the metal absorption liquid in the neutralization tank 52 is 5 to 7, as well as a supply amount of the pH adjuster from a pH adjuster supply device 63 is controlled by the control device 100, so that the pH of the heavy-metal absorption liquid in the circulation tank 49 is 1 to 3. Further, as the pH adjuster used in the respective pH adjuster supply devices 60 and 63, an alkaline agent (NaOH, $Na_2CO_3$, $CaCO_3$, $Ca(OH)_2$ etc.) and acid (such as hydrochloric acid and sulfuric acid) may be used.

Figure 3A:
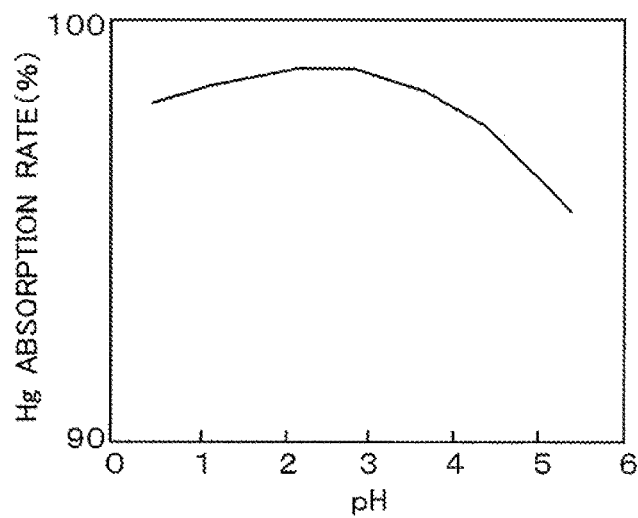
FIGS. 3(A) to 3(C) are diagrams illustrating an example of pH, mercury absorption and $SO_2$ absorption characteristics of a heavy-metal absorption liquid.
Figure 3B:
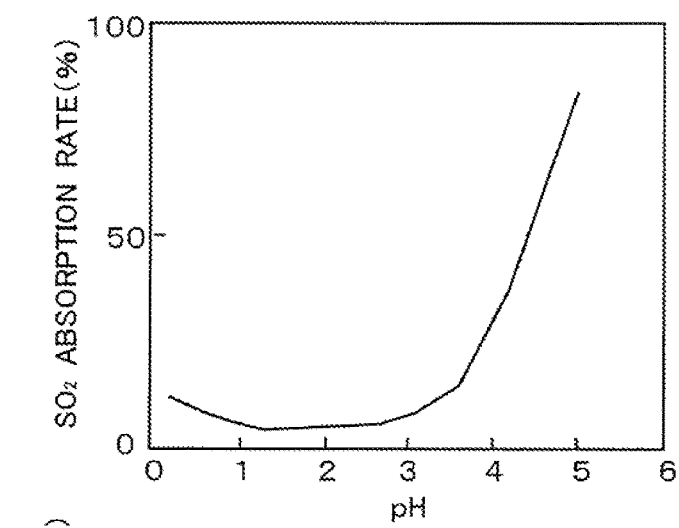
Figure 3C:
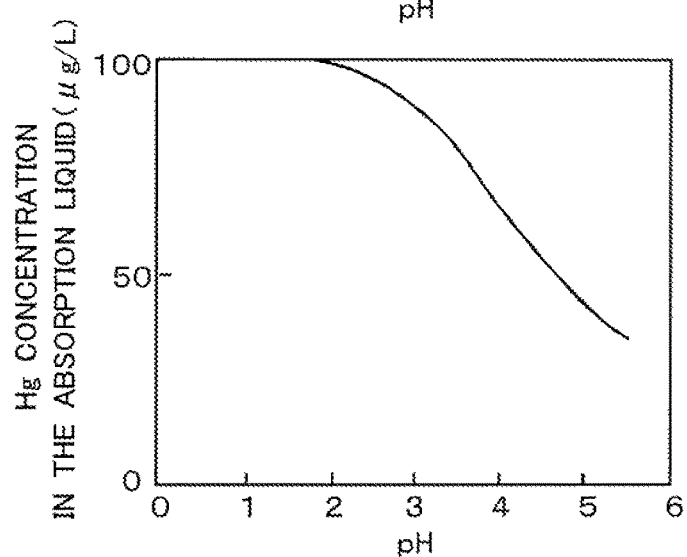

It can be also seen from FIGS. 3 (A) and 3 (B) that re-emission of the mercury may be suppressed by adjusting the pH of the absorption liquid to 1 to 3. In particular, since the pH of the heavy-metal absorption liquid is changed with 3 as a boundary, it is desirable to control the pH thereof in the vicinity of 3.

The heavy-metal absorption liquid absorbs a trace amount of heavy metal such as mercury in the exhaust gas, as well as removes a part of the ash dust in the exhaust gas. A part of the absorption liquid containing the absorbed oxidized mercury is sent to the neutralization tank 52 through the extraction pipe 51, and the pH thereof is adjusted to about 5 to 7. The mercury in the absorption liquid is adjusted to the pH of 5 to 7, such that the mercury migrates to the ash dust contained in the liquid and is adsorbed to the ash. Therefore, it is possible to efficiently remove the mercury.

In the neutralization tank 52, Cr (chloride) and Al (aluminum), etc. contained in the heavy-metal absorption liquid are deposited to become a solid. Further, a solid heavy metal scavenger in a chelate form (there are, for example, Unicellex (registered trademark) UR-120H (manufactured by Ataka Maintenance Co., Ltd), Epolas (registered trademark) Z-7 (manufactured by Miyoshi-Yushi Co., Ltd), etc.) is supplied from a heavy-metal scavenger supply device 61 by matching an Hg concentration in the exhaust gas, such that the mercury, or the like in the heavy-metal absorption liquid is adsorbed to the heavy-metal scavenger.

Specifically, the Hg concentration in the exhaust gas is measured by a mercury monitor 72 installed on the outlet duct of the dust collector 4, and the measured signal (Hg concentration measurement signal) is input to the control device 100, such that an output signal is sent from the control device 100 to the heavy-metal scavenger supply device 61 to control the supply amount of Hg. Otherwise, there is a method in which an amount of mercury in the coal is measured in advance, and the supply amount of Hg from the heavy-metal scavenger supply device 61 is controlled based on the measured value. The amount of the heavy-metal scavenger supplied from the heavy-metal scavenger supply device 61 or the pH adjuster supplied from the pH adjuster supply devices 60 and 63 may be easily adjusted by controlling opening and closing of valves of pipes provided in each device.

Further, examples of the heavy-metal scavenger include a chelating agent having a glucamine group, an iminodiacetic acid group, a polyamino group, a dithiocarbamic acid group and the like.

Thereby, in addition to mercury (Hg) in the heavy-metal absorption liquid, a part of Pd (palladium), Cd (cadmium) and Se (selenium) is attached to the heavy-metal scavenger. Thereafter, the heavy metal in the absorption liquid migrates to the solid side, and a solid component 65 is separated and removed by using a thickener and a dehydrator as the solid-liquid separator 53. At the same time, the heavy metal such as Hg attached to the heavy metal scavenger is discharged to the outside of the system, and is treated as a controlled waste. In addition, the migration of heavy metal to the solid side is facilitated in the neutralization tank 52, such that the heavy metal may be efficiently recovered by the solid-liquid separator 53. The recovered solid component 65 was measured by the reduction vaporization-atomic absorption methods, and as a result, the mercury removal rate of the solid component 65 was 80 to 85% of the total.

Further, in the present example, the above-described chelating agent was used as the heavy-metal scavenger, but the same effect may also be obtained by using an inorganic flocculant, a polymer flocculant and the like.

Examples of the inorganic flocculant include PAC (poly-aluminum chloride), aluminum sulfate, iron chloride (ferric chloride), or the like, and examples of the polymer flocculant include a cationic polymer (a water-soluble aniline resin, polythiourea, polyethylenimine, etc.), an anionic polymer (sodium alginate, sodium polyacrylate, etc.), a non-ionic polymer (polyacrylamide, polyoxyethylene, etc.), or the like, which may be used according to properties of the heavy-metal absorption liquid.

Further, in the present example, the thickener and the dehydrator are used as the solid-liquid separator 53, however, other means may be used so long as it can separate and remove the solid. For example, a liquid cyclone, filters, a centrifugal separator, and the like may be used.

The absorption liquid separated by the solid-liquid separator 53, from which the heavy metal such as the mercury is removed, is sent to the storage tank 54 and reused by returning to the heavy-metal absorption tower 45 by the pump 55 through an absorption liquid return pipe 56. Therefore, water used in the heavy-metal component removal device 10 may be saved.

Further, at this time, if all the heavy-metal absorption liquid is returned to the heavy-metal absorption tower 45, there are problems that the concentration of chlorine in the heavy-metal absorption liquid is increased, and corrosion of the material is accelerated. Since the chlorine in the absorption liquid is not removed by the heavy metal scavenger, most of the chlorine remains in the absorption liquid, and may be condensed by repeatedly reusing. Accordingly, a part thereof is extracted and sent to the wastewater treatment device 67, and is discharged to the outside of the system, such that the concentration of chlorine in the heavy-metal absorption liquid enters in a predetermined value (for example, 3000 ppm).

Example 2

Figure 2:
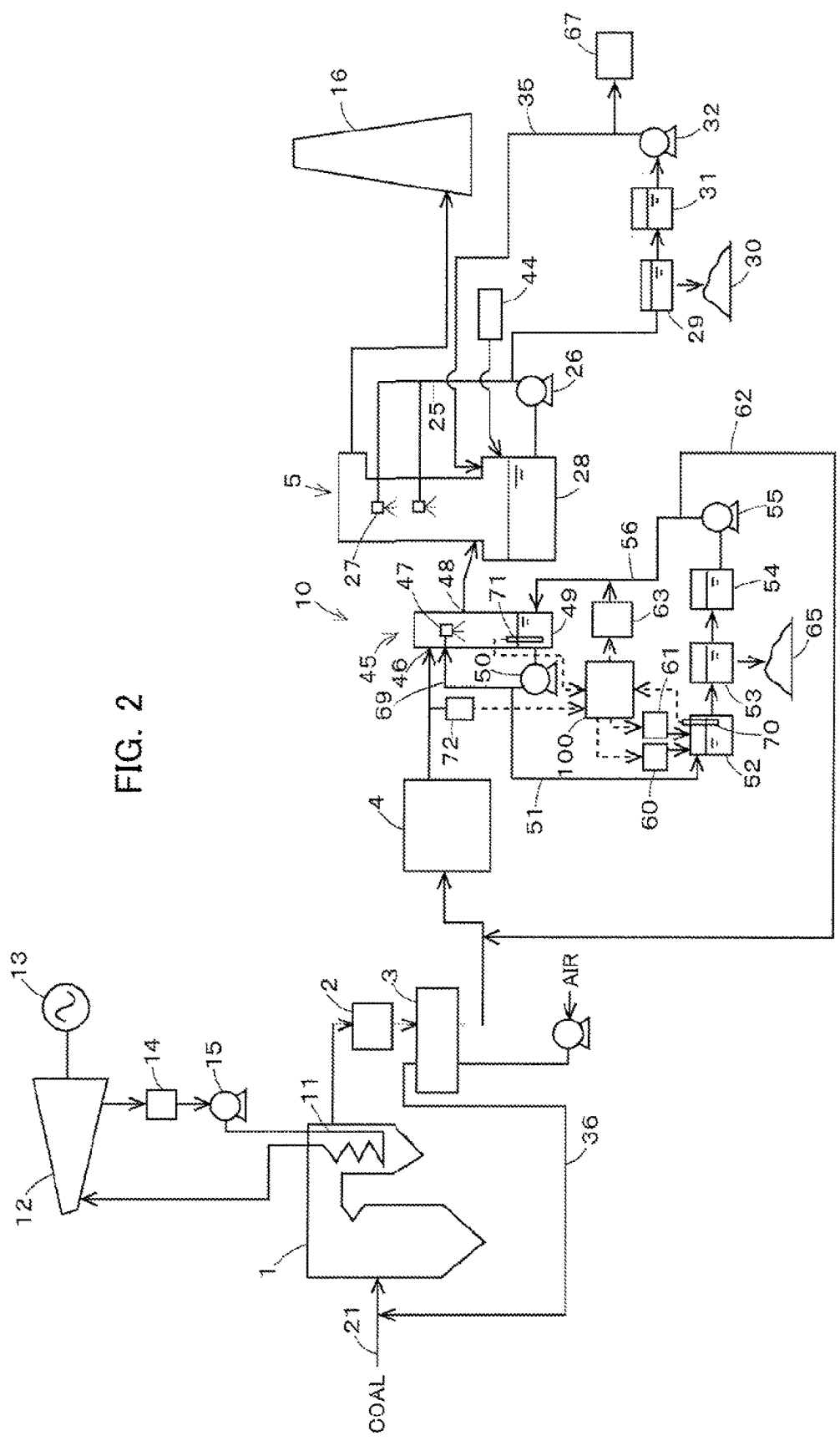
FIG. 2 is a view illustrating a structure of an exhaust gas treatment apparatus which is another example (Example 2) of the present disclosure.

FIG. 2 illustrates another example of the present disclosure. In the present example, a part of the absorption liquid after removing the solid component 65 from the heavy-metal absorption liquid of the heavy-metal absorption tower 45 by the solid-liquid separator 53 is supplied to the upstream side of the exhaust gas flow path of the dust collector 4 by a wastewater return pipe (waste fluid supply unit) 62. This configuration is different from that of Example 1 in this aspect, and the other configurations are the same as those of Example 1.

In the absorption liquid after the solid component 65 is separated by the solid-liquid separator 53, most of the heavy-metal components such as mercury are removed, and a component, mainly chlorine which cannot be removed by the heavy-metal scavenger is included therein. By adding the heavy-metal absorption liquid to a duct on the upstream side of the dust collector 4, moisture is vaporized by the high-temperature exhaust gas, and the chlorine forms a salt with the components in the exhaust gas to become a solid, which will be removed by the dust collector 4 on the downstream side together with the solidified ash. Accordingly, the chlorine in the exhaust gas is also efficiently removed.

Due to the present configuration, the heavy-metal component contained in the exhaust gas may be collected and recovered in the solid component 65 separated by the solid-liquid separator 53. In addition, since a wastewater from the heavy-metal component removal device 10 is not generated, a wastewater treatment equipment of the entire exhaust gas treatment apparatus becomes a simple configuration and costs of equipment may be reduced.

Further, a configuration, in which a part of the absorption liquid is extracted from the absorption liquid return pipe 56 or the wastewater return pipe 62, and is sent to the wastewater treatment device 67 (FIG. 1) to treat the heavy metal, etc. contained in the wastewater, may be added to the exhaust gas treatment apparatus. Furthermore, also according to the present example, the same effects as Example 1 may be obtained.

INDUSTRIAL APPLICABILITY

The present disclosure may be also applied to other combustion furnaces other than the boiler, thereby having industrial availability as a technique for removing Hg in the exhaust gas.

DESCRIPTION OF REFERENCE NUMERALS

1 Boiler
2 Denitration device
3 A/H
4 Dust collector
5 Desulfurization device
10 Heavy-metal component removal device
11 Heat exchanger
12 Turbine
13 Power generator
14 Condenser
15, 26, 32, 50, 55 Pump
16 Chimney
21 Coal supply line
25, 69 Circulation pipe
27 Desulfurization spray nozzle
28 Desulfurization/absorption liquid circulation tank
29 Gypsum separator
30 Gypsum
31, 54 Storage tank
35 Desulfurization absorption liquid return pipe
36 Combustion air supply line
44 Calcium carbonate supply device
45 Heavy-metal absorption tower
46 Absorption tower inlet
47 Heavy-metal absorption liquid spray nozzle
48 Absorption tower outlet
49 Heavy-metal absorption liquid circulation tank
51 Absorption liquid extraction pipe
52 Neutralization tank
53 Solid-liquid separator
56 Absorption liquid return pipe
60, 63 pH adjuster supply device
61 Heavy-metal scavenger supply device
62 Wastewater return pipe
65 Solid content
67 Wastewater treatment device
70, 71 pH meter 72 Mercury monitor
100 Control device

The invention claimed is:

1. A coal-fired boiler exhaust gas treatment apparatus comprising:
   (a) a denitration device including a denitration catalyst to remove nitrogen oxide in an, exhaust gas,
   (b) a dust collector configured to remove ash dust in the exhaust gas,
   (c) a heavy-metal component removal device configured to remove a heavy-metal component in the exhaust gas, the heavy-metal component removal device comprising;
   an absorption tower including a heavy-metal absorption unit configured to spray an acidic absorption liquid having a pH of 1 to 3 for absorbing heavy metal to the ex-haunt gas, a storage unit configured to store a heavy-metal absorption liquid ab-sorbing the heavy metal in the heavy-metal absorption unit, and a circulation unit configured to supply the heavy-metal absorption liquid of the storage unit to the heavy-metal absorption unit; an extraction unit configured to extract the heavy-metal absorption liquid from the absorption tower; a neutralization unit configured to supply a pH adjuster to the heavy-metal absorption liquid extracted by the extraction unit and neutralize the same so that the pH of the heavy-metal ab-sorption liquid in the neutralization unit is 5 to 7; and a solid-liquid separation unit configured to separate a solid component and a liquid component from the heavy-metal absorption liquid neutralized in the neutralization unit,
   (d) a desulfurization device configured to remove sulfur oxide in the exhaust gas by an absorption liquid and a denitration device, a dust collector, a heavy-metal component removal device and a desulfurization device are sequentially disposed from an upstream side to a downstream side of exhaust gas flow.

2. The coal-fired boiler, exhaust gas treatment apparatus according to claim 1, further comprising a waste fluid supply unit configured to supply a part of the liquid component separated by the solid-liquid separation unit to the exhaust gas flow path between the denitration device and the dust collector.

3. A coal-fired boiler exhaust gas treatment method in which nitrogen oxide in an exhaust gas discharged from a boiler using coal as a fuel is removed by a denitration catalyst, and ash dust is removed from the exhaust gas after removing the nitrogen oxide, and then sulfur oxide is removed from the exhaust gas by an absorption liquid after removing the ash dust, the coal-fired boiler exhaust gas treatment method comprising:
   spraying an acidic absorption liquid having a pH of 1 to 3 for absorbing heavy metal to the exhaust gas after removing the ash dust and before removing the sulfur oxide;
   again using the heavy-metal absorption liquid after spraying for absorbing the heavy metal, and supplying a pH adjuster to a part of the heavy-metal absorption liquid after spraying, thus to neutralize the same so that the pH of the heavy-metal absorption liquid is 5 to 7; and
   separating a solid component and a liquid component from the neutralized heavy-metal absorption liquid, thus to remove a heavy-metal component in the exhaust gas.

4. The coal-fired boiler exhaust gas treatment method according to claim 3, further comprising supplying a part of the separated liquid component to the exhaust gas after removing the nitrogen oxide and before removing the ash dust.

* * * * *